(No Model.)
A. F. THAYER.
BUTTER PURIFYING APPARATUS.
No. 439,310. Patented Oct. 28, 1890.
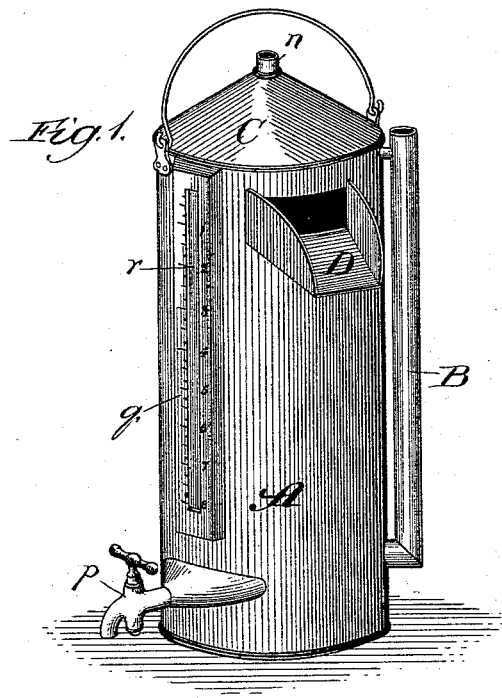
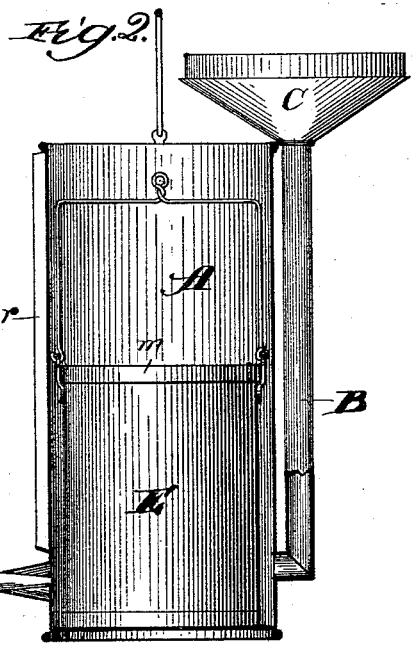
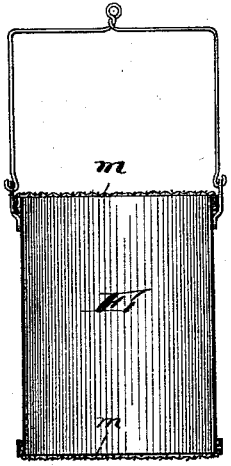

UNITED STATES PATENT OFFICE.

ALBERT F. THAYER, OF MAPLE HILL, KANSAS.

BUTTER-PURIFYING APPARATUS.

SPECIFICATION forming part of Letters Patent No. 439,310, dated October 28, 1890.

Application filed June 13, 1890. Serial No. 355,369. (No model.)

*To all whom it may concern:*

Be it known that I, ALBERT F. THAYER, a citizen of the United States, residing at Maple Hill, in the county of Wabaunsee and State of Kansas, have invented a new and useful Improvement in Methods of and Apparatus for Skimming Liquid, of which the following is a specification.

Very frequently the spoiling of butter is attributable to the buttermilk it contains.

The object of my invention is to provide an apparatus whereby spoiled butter may be readily and effectively purified by relieving it of the buttermilk.

My improved apparatus is illustrated in the accompanying drawings, in which—

Figure 1 is a perspective view; Fig. 2, a vertical sectional view, and Fig. 3 a view in sectional elevation of a detail.

A is a vessel made, preferably, of sheet metal, and provided in one side with a vertical glass-covered opening $r$, bounded by a gage $q$. At the base of the vessel is a faucet $p$, and into the base portion leads a pipe B, extending upward to or nearly to the upper end of the vessel, or at least beyond the overflow-spout D, extending from one side of the vessel near its upper end. The cover C is of funnel shape, with a nipple $n$ at its apex to fit into or upon the upper end of the stand-pipe B, when the device C is to serve the purpose of a funnel, and at the opposite end it fits the open upper end of the vessel A, thereby adapting it to its purpose of a cover.

E is a receptacle for the butter to be treated, and which fits inside and rests on the bottom of the vessel A. The receptacle E, which should also be formed of sheet metal, has perforated covers or strainers $m$ at its opposite ends.

To use the apparatus, the vessel A is filled with heated water, which should be about as hot as the hand can bear. The receptacle E, previously supplied with the impure butter, is submerged in the outer vessel, the water in which enters the inner receptacle freely through its foraminous ends. In a few minutes the butter will melt and rise through the upper strainer $m$ to the top of the water in the vessel A, and as it melts it releases the buttermilk it contains, which is assimilated by the water, leaving the butter sweet and pure floating on the water. When all the butter has thus been melted, it is floated off into a suitable receptacle (as a bowl) through the spout D by pouring water into the pipe B through the cover C, (then adjusted in inverted position on the pipe to form a funnel,) the added water thus entering the vessel A at its base and raising the contents thereof to bring the floating butter to the spout D and cause it to run off. The melted and purified butter should then be quickly chilled to harden it by pouring it into sufficiently cold water, when it is in a condition to be worked and salted.

What I claim as new, and desire to secure by Letters Patent, is—

A butter-purifying apparatus comprising, in combination, a vessel A, having a draw-off cock $p$ near its base, an overflow-spout D near its upper end, and a stand-pipe B, extending into its base portion, a convertible cover C, and a receptacle E for the butter to be treated, having foraminous ends and removably supported inside the vessel A on the bottom thereof, substantially as and for the purpose set forth.

ALBERT F. THAYER.

In presence of—
W. H. DYRENFORTH,
M. J. FROST.